Patented Nov. 20, 1945

2,389,469

UNITED STATES PATENT OFFICE 2,389,469

METHOD OF MANUFACTURE OF ADHESIVE TAPES

Frank J. Tone, Niagara Falls, Osborne L. Mahlman, Kenmore, and Fred Brown, Niagara Falls, N. Y., assignors to The Carborundum Company, Niagara Falls, N. Y., a corporation of Delaware No Drawing. Original application June 14, 1937, Serial No. 148,104. Divided and this application September 25, 1941, Serial No. 412,338

5 Claims. (Cl. 117—122)

This invention relates to adhesive tapes and methods of manufacturing the same. More specifically, the invention is directed to improvements in tapes which are normally re-usable by reason of the character of the adhesive employed and the unification of the adhesive to the supporting backing material.

The present application is a division of our copending application, Serial No. 148,104, filed June 14, 1937.

The adhesive tapes of our invention are applicable to a number of uses such as in the painting of automobile bodies where it is desirable to protect certain parts of the surfaces from the paint which is being sprayed on, for use in surgery or other similar purposes where the usual surgical tape is employed, for electrical purposes in place of the well-known electrical tapes and in general, for the purposes for which tapes of this character are commonly used.

It is desirable in tapes of this kind that the adhesive which is used shall be sufficiently strong so that it maintains its unity when the tape is removed from the object on which it is placed, that the adhesive be sufficiently tacky so that the tape can be made to adhere to non-adhering surfaces by merely pressing it against such surfaces, and that the cohesion between the adhesive and the backing of the tape be greater than the adhesion of the adhesive to the surface being coated. In such case, the tape can be easily applied by merely laying it on the surface and rubbing lightly and yet it can be removed as a unit by pulling and stripping it from the surface. Adhesives which are permanently tacky and adapted to be made to stick to surfaces by the application of pressure alone are aptly called "pressure-sensitive adhesives."

Where the tape is to be used to protect surfaces from lacquer or paint, it is necessary that the surface of the tape which is exposed when the tape is in place, be resistant to the action of the solvents employed in the lacquer or the paint so that the tape will not be affected by the lacquer which is sprayed against it.

Heretofore tapes of this character have been made which include specially prepared paper as, for example, in accordance with Re. Patent 19,128. In order to make such tapes which will be satisfactory, it is necessary to employ a considerable number of steps. In the first place, the paper must be specially treated to unify it so that the individual fibres of the paper will not be stripped off and adhere to the adhesive surface when the tape is unrolled. In order to obtain a unification of the adhesive with the treated paper, it is necessary to first coat a surface of the paper with a highly adhesive material so that the coating of adhesive which is to be subsequently applied will be strongly adherent to the coated side of the paper. And finally, it is necessary to treat the back of the paper with a special material which further unifies the fibres of the paper and also assists in the removal of the adhesive from the back of the paper when the tape is wound into a roll. Where the tape is to be used for masking purposes it is also desirable that the paper be crinkled or creped so as to permit of sufficient distortion to allow adjustment of the tape to curved surfaces.

We have discovered that very excellent adhesive tapes can be prepared in a much simplified manner by the use of special kinds of backings and by employing new methods which we have invented.

The backing materials which we have found to be especially suited for the preparation of our tapes include a number of materials which are broadly classifiable under the term "plastics." By "plastics" we mean materials which are capable of being put into solution with solvents and which deposit from such solvents films having a requisite strength and other properties which are desired in adhesive tapes. For example, we have found it to be desirable in making tapes which are to be used as so-called "masking tapes" for use in protecting surfaces against lacquer, to employ plastic materials which are adapted to be stretched to some extent so that the tape will be made to conform to curved surfaces.

Among the materials which we have found to be suited for use in our improved tapes are rubber, which may be vulcanized, dispersions of rubber in waxy materials, modified rubbers or rubbers made by reacting crude rubber with various chemicals, and certain film-forming resins such as the acetals or partial acetals of polymerized vinyl esters.

Our invention includes a number of variations of a method which we have found to be especially well adapted for the preparation of tape employing plastic materials as the backing. Generally speaking, the method includes the step of unifying the backing material with the adhesive material by either heating films of the adhesive and the backing, by employing a liquid which is a solvent for both the adhesive and the plastic material, or by a combination of these steps.

In carrying out one form of our invention, we provide a web of a supporting backing material, which may have a somewhat roughened or creped surface to make the surface of the adhesive irregular, onto which we coat a pressure-sensitive adhesive. We then apply a backing material to the exposed surface of the adhesive and cause a unification of the adhesive with the backing by any of the methods just described, and then strip the tape thus formed from the supporting web, after removal of the solvent if the films are formed from solutions. The supporting web may be of any suitable material such as a well-sized cloth or paper or even metal. The adhesive may be any of the well-known materials and specifically, it may comprise rubber, a suitable resin, and zinc oxide as described in Example A of the Re. Patent 19,128.

Alternatively the backing may be applied first to the supporting web and the adhesive subsequently applied, an intermediate and highly adhesive layer being interposed between the backing and the pressure-sensitive adhesive according to either method, if this is considered to be desirable.

The backing material may be applied to the adhesive in the form of a pre-formed film or alternatively, the plastic material which is to form the backing may be dissolved in a suitable solvent and coated onto the adhesive by any suitable method such as by transferring it from a roll which is caused to rotate in a vat of the solution.

Alternatively, the backing material may be formed into a film and then coated with the adhesive which has been put into solution in a solvent which is or which contains a solvent for the backing material. Where the backing is strongly attacked by the solvent, it is desirable that it be supported on a web until such time as the solvent has been removed and the backing has again become strong enough to be self-supporting.

An alternative method of forming our improved tapes comprises the separate preparation of webs of the adhesive and of the backing material and the subsequent unification of these two films. Unification may be brought about by wetting the surface of either or both of the films so as to bring about a mutual solution when the films are joined in the presence of the solvent, followed by the subsequent removal of the solvent. Alternatively, the films of adhesive and of backing material may be brought together while either or both of them are heated to the point where they become sufficiently plastic so that unification is brought about when the films are joined.

As set forth above the adhesive employed may be any one of the well-known materials, and specifically it may be of resin described in Example A of the Re. Patent 19,128. Such adhesive is composed of the following ingredients:

| | Pounds |
|---|---|
| Plasticized, first quality plantation rubber such as clear crepe or smoked sheets | 10 |
| Cumaron gum or resin | 2 |
| Zinc oxide pigment | ½ |

In place of the cumaron gum or resin, which is preferably an artificial resinous material coming under the group name of cumaron and indene resins, there may be employed a low boiling point natural resin as, for instance Burgundy pitch or pine oil foots. The above ingredients are compounded on a rubber rolling mill to a plastic condition and then cut to desired body or consistency with a rubber solvent such as benzol or a petroleum solvent such as high test gasoline.

The solutions of adhesives composed of rubber and resin such as that given specifically above, when made of a consistency or viscosity such that they are capable of being applied to form films of suitable thickness, are commonly very sticky and stringy and accordingly are difficult to apply in coatings of uniform thickness. We have found that this difficulty with such solutions can be overcome by first forming such solutions preferably of a viscosity higher than would normally be used if the solution itself were to be employed as the coating material, and then dispersing in such solution a small amount of water with the aid of a suitable dispersing agent. Such dispersions, when suitably made, are not at all stringy and sticky, but are rather of a buttery consistency so that they can be very readily smoothed out much in the manner in which a soft butter can be spread. In preparing such dispersions, we employ a dispersing agent which is soluble in a solvent but insoluble in water. By incorporating such a dispersing agent in a solution of adhesive and then adding small quantities of water and agitating as by rapid stirring, the water is caused to disperse through the mass of solution and appears to break up the solution and form the buttery consistency which we have described. Suitable dispersing agents are diglycol laurate and calcium resinate or other oil-soluble and water-insoluble soap or ester. We have found that dispersions of desirable consistency and spreadability can be made by adding to a rather stiff and viscous solution of rubber and resin in gasoline, approximately 1 to 2 per cent of the dispersing agent and then stirring in about 2 to 4 percent of water. Such dispersions are well adapted for use in coating all types of backings including paper and cloth as well as the plastic materials of our invention.

One particular material which we have found to be especially well suited for use in our masking tapes comprises the product described and claimed in the patent to Abrams et al. No. 2,054,112. These compositions comprise rubber and a waxy material, specifically paraffin wax. They may be employed either as the backing material or as the adhesive material or for both purposes by choosing suitable proportions of the wax and rubber and by adding a suitable tack-producing agent such as resin or oil to the adhesive composition. Such compositions are especially well-adapted for the production of adhesive tapes by the method where the adhesive and the backing are joined and unified by the use of heat. Films of the compositions can be prepared in accordance with Patent No. 2,054,114, two separate films being made and brought together while in the heated condition so as to obtain the desired unification of the adhesive to the backing. Such tapes have been found to be well suited for many purposes and in addition we have successfully prepared tapes by employing the rubber and wax composition as the backing material and coating films of such material with the rubber-resin-zinc oxide adhesive which is more conventionally employed in tapes of this character.

Where the tapes are to be employed for masking purposes, the solvent for the lacquer tends to soften these rubber-wax compositions and it is accordingly desirable that the back of the tape be coated to protect it from attack by the solvents used in lacquers. One method which we have successfully employed for overcoming this difficulty comprises first forming the tape by any of the methods heretofore described and then painting the tape with a solvent-protecting material. Such material may be rubber, suitably plasticized polymerized styrene, a thin sheet of vulcanized rubber (which may include sufficient filler such as wood flour so as to make the rubber weak and readily torn), or other film-forming materials which are unaffected by solvents employed in lacquers.

Other backing materials which we have employed successfully in making our improved tapes comprise such materials as the acetaldehyde acetal of polyvinyl acetate, flexibilized by the addition of about 5% of a suitable plasticizing agent such as tricresyl phosphate. These resins are soluble in lacquer solvents and one method which we have used to protect them against attack by such solvents comprises applying a film of an aluminum varnish which comprises finely pulverized aluminum suspended in an oil base varnish. Upon oxidation of the oil the thus-formed film is rendered highly resistant to the action of lacquer solvents. Alternatively, the backings may be protected against attack by such solvents by applying to them, while they are still liquid and adhesive, a thin layer of protective material such as powdered aluminum, very finely pulverized wood flour, or the finely divided cellulosic material commonly known as "alpha flock."

While we have described our invention by reference to certain embodiments, the invention is susceptible to various modifications such as the inclusion of medicants in tape for use for surgical purposes, the employment of highly adhesive films intermediate between the backing and the pressure-sensitive adhesive, or of protective films on the uncoated side of the backing. Such modifications and other obvious alterations in the struccture as well as other methods and materials may be employed wtihout departing from the spirit of the invention, the scope of which is set forth in the appended claims.

We claim:

1. In a method of making adhesive tape, the steps which comprise making a rather stiff and viscous solution of a pressure-sensitive adhesive mixture comprising rubber, a resin, and zinc oxide in a non-aqueous solvent, adding to said solution a small percentage of a water-in-oil type dispersing agent which is insoluble in water but soluble in the said non-aqueous solvent, dispersing about 2–4% of water in the said solution to form a water-in-oil type dispersion having the smooth-spreading property characteristic of a soft butter, spreading said dispersion on a backing, and removing the water and solvent from the dispersion.

2. In a method of making adhesive tape, the steps which comprise making a rather stiff and viscous solution in gasoline of a mixture comprising rubber, coumarone resin, zinc oxide, and a small percentage of a water-in-oil type dispersing agent selected from the group consisting of diglycol laurate and calcium resinate, dispersing a small percentage of water through the adhesive solution with the water in the dispersed phase, spreading the dispersion thus formed on a backing, and removing the water and solvent from the dispersion, said dispersion having the smooth-spreading property characteristic of a soft butter.

3. In a method of making adhesive tape, the steps which comprise making a rather stiff and viscous solution of a rubber-base pressure-sensitive adhesive in a non-aqueous solvent, adding to said solution a small percentage of a water-in-oil type dispersing agent which is insoluble in water but soluble in the said non-aqueous solvent, dispersing about 2–4% of water in the said solution to form a dispersion having the smooth-spreading property characteristic of a soft butter, spreading said dispersion on a backing, and removing the water and solvent from the dispersion.

4. In a method of making adhesive tape, the steps which comprise making a dispersion having the consistency and smooth-spreading property characteristic of a soft butter and comprising approximately 2–4% of water dispersed through a rather stiff and viscous solution of a pressure-sensitive adhesive containing approximately 1–2% of a water-in-oil type dispersing agent, spreading the said dispersion on a backing, and removing the water and solvent from the dispersion, said adhesive comprising a rubber compound and a resinous tackiness-augmenting agent.

5. In a method of making adhesive tape, the steps which comprise making a dispersion having the consistency and smooth-spreading property characteristic of a soft butter and comprising approximately 2–4% of water dispersed through a rather stiff and viscous solution of an adhesive which is permanently tacky and adapted to be made to stick to surfaces by the application of pressure alone and containing approximately 1–2% of diglycol laurate, spreading the said dispersion on a backing, and removing the water and solvent from the dispersion, said adhesive comprising a rubber compound and a resinous tackiness-augmenting agent.

FRANK J. TONE.
OSBORNE L. MAHLMAN.
FRED BROWN.